Figure 1:
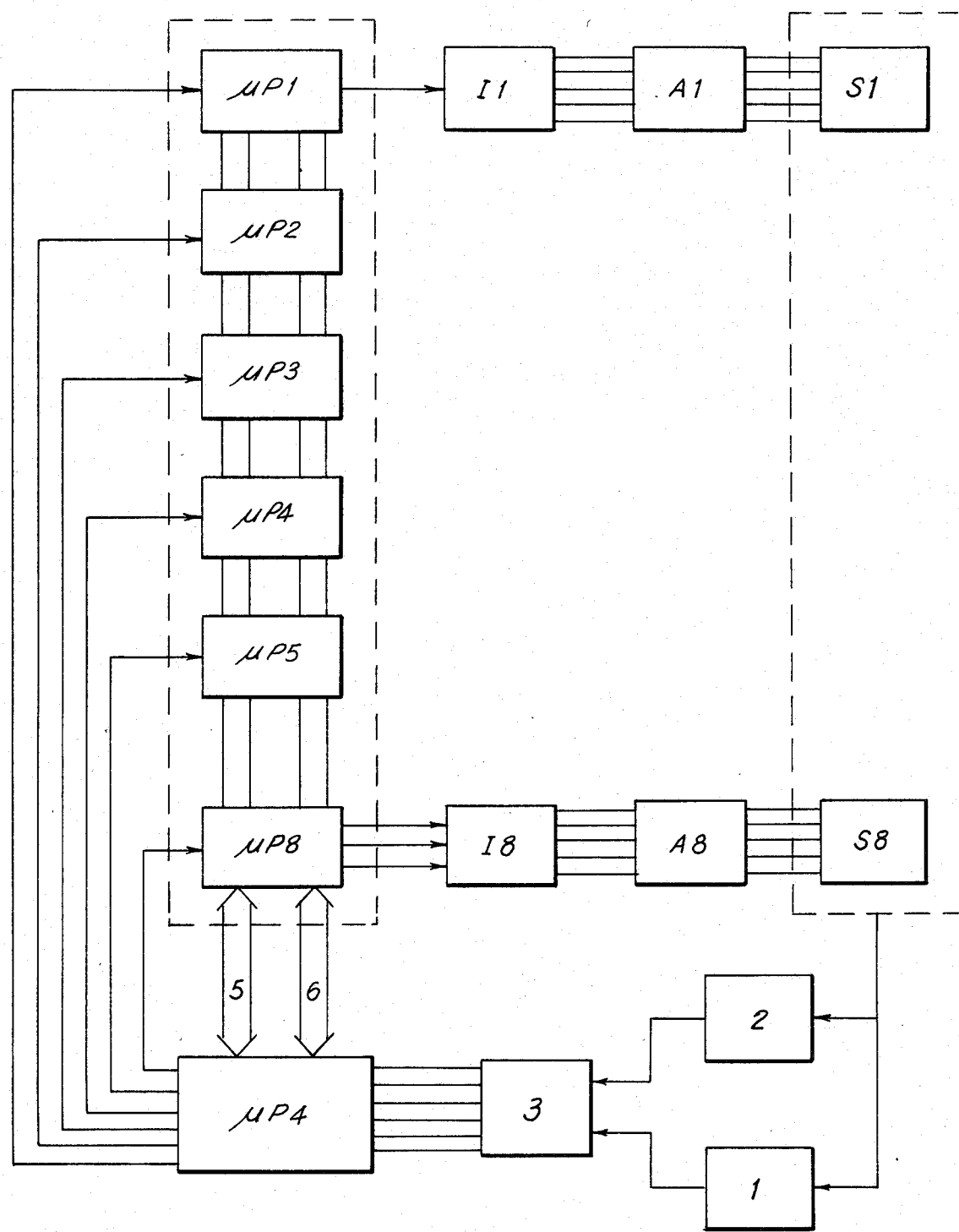

United States Patent [19]

Rodriguez-Fernandez et al.

[11] Patent Number: 4,615,723
[45] Date of Patent: Oct. 7, 1986

[54] INTELLIGENT CONTROLLER FOR PREDICTING AND AUTOMATICALLY COMPENSATING FOR VARIATIONS IN CYCLE TIME, IN MACHINES FOR FORMING ARTICLES OF GLASS OR OTHER MATERIALS

[75] Inventors: Hector M. Rodriguez-Fernandez, Garza Garcia; Santiago Rodriguez-Tovar, Monterrey, both of Mexico

[73] Assignee: Vitro Tec Fideicomiso, Monterrey, Mexico

[21] Appl. No.: 788,239

[22] Filed: Oct. 17, 1985

Related U.S. Application Data

[63] Continuation of Ser. No. 607,817, May 7, 1984, abandoned.

[30] Foreign Application Priority Data

May 19, 1983 [MX] Mexico ................................. 197359

[51] Int. Cl.$^4$ ............................................... C03B 9/40
[52] U.S. Cl. ........................................ 65/163; 65/158; 65/159; 65/160; 65/DIG. 13; 364/473; 364/476
[58] Field of Search .................... 65/29, 163, 164, 159, 65/158, 160; 364/473, 476

[56] References Cited

U.S. PATENT DOCUMENTS

| | | | |
|---|---|---|---|
| Re. 29,188 | 4/1977 | Croughwell | 65/163 |
| 4,007,028 | 2/1977 | Bublitz et al. | 65/163 |
| 4,108,623 | 8/1978 | Cárdenas-Franco et al. | 65/163 |
| 4,453,963 | 6/1984 | Larson et al. | 65/163 X |
| 4,457,772 | 7/1984 | Haynes et al. | 65/163 X |

Primary Examiner—Arthur Kellogg
Attorney, Agent, or Firm—Abelman Frayne Rezac & Schwab

[57] ABSTRACT

The present invention refers to an intelligent controller for predicting and automatically compensating for variations in cycle time, in machines for forming articles of glass or other materials, by predicting estimated cycle periods of the machine based on present and past measurements, so as to effect compensations without mechanical failures and/or without having to repeat cycles, even in cases when the information signals from the machine are lost; and which comprises: at least one forming cycle sensor for the whole of the machine; a signal conditioner which conditions the signals detected by the forming cycle sensor of the machine; at least one real-time data processing unit that calculates the initial forming cycle time and the times of operation of the forming mechanisms and compares the present and past cycle times in order to predict the next start-up of the forming cycle of whatever section of the machine, and-/or determine the cycle in cases where the detected signals are lost, and supplies said prediction and compensation data to the central or master controller of the machine so that said controller, through its appropriate interfaces and actuators, can control the actuating of the mechanisms of the sections of the machine and with the prediction and compensation data from the data processing unit of said intelligent controller, in order to bring about proper and reliable functioning of the machine.

1 Claim, 2 Drawing Figures

INTELLIGENT CONTROLLER FOR PREDICTING AND AUTOMATICALLY COMPENSATING FOR VARIATIONS IN CYCLE TIME, IN MACHINES FOR FORMING ARTICLES OF GLASS OR OTHER MATERIALS

This is a continuation of application Ser. No. 607,817 filed May 7, 1984 now abandoned.

BACKGROUND OF THE INVENTION

The automatic forming of glass articles, particularly containers such as bottles and jars, is performed in the so-called "I.S. machines" that are well known in the art and which generally are made up of eight sections of one or several cavities located beneath a glass feeder which supplies them with gobs of molten glass for the purpose of forming the articles.

Each section of the forming machine comprises approximately nineteen mechanisms which operate sequentially to carry out a predetermined forming function and which are also synchronized in predetermined forming cycles with respect to the other individual sections of the machine.

The element required to synchronize all the mechanisms of the machine is the well known Mechanical Timing Drum.

At the present time, such mechanical timing drums have been replaced by electronic controls which tend to impart a more precise synchronization to the actuation of the mechanisms of each section of the machine, thereby allowing the response speed of the mechanisms to be considerably increased and, as a consequence, the production rate of articles to be raised.

However, both the mechanical timing drums and the present-day electronic controllers have a difficulty relating to the adjustment of the timing of each mechanism and the successive repetition of the forming cycles.

In U.S. Pat. No. 3,762,907 by Quinn et al, there is described and claimed an electronic control system for performing the operation of automatic synchronization of the machine sections using a shaft encoder coupled mechanically to the machine, so as to generate the necessary pulses to cause the mechanisms to be fired synchronously with the machine as determined by the synchronization shaft.

In said controller, pulses may be lost from causes such as the wearing of the mechanical parts of the encoder and failures in the mechanical linkage of the parts thereof, so that the several sections of the machine lose their synchronization, the mechanisms knocking against each other on not being properly synchronized in their operation as a result of the time limits among them not being observed.

On the other hand, said control lacks flexibility since, although it is possible to increase the speed of gob cutting and of forming by increasing the rate at which the encoder generates pulses, there is no capacity for automatically changing the speed of operation of the mechanisms of the machine sections consequent upon changes in cycle (times) during the operation of the machine.

In Mexican Pat. No. 145,266 (U.S. Pat. No. 4,108,623) held by the same licensee as the present applicant, there is described and claimed an electronic control system consisting essentially of a pre-programmed controller for sequentially controlling all the forming operations of the machine, a generator of pulses of constant frequency to operate as a real-time clock to measure the time and duration of each operation controlled by the controller, a gob detector which detects the moment at which a gob coming from the glass feeder is cut so as to inform the controller of the ending of a previous cycle and the beginning of a new one, and a temperature detector to detect the passage of the gob toward the mold and to inform the controller thereof so as to trigger the forming cycle of the corresponding section.

Said controller calculates the time taken by a gob from its cutting in the glass feeder to its reception in the mold of whatever section, and on this basis calculates the total cycle time of the machine with its first speed parameters, in such a way that, as the cutting and transportation of the gob continue to be detected the mechanisms of each section of the machine are allowed to function properly and in a synchronous manner with the total cycle initially calculated by the control.

In this way, on receiving the signal from the gob cutting sensor, even though the gob passage signal be lost, the control is enabled to command the forming cycle of the section concerned, the new cutting signal being available for the remainder of the sections.

Nevertheless, this control calculates the cycle time only at the beginning or start-up of the whole machine, but does not have the capability to calculate and keep it current with changes in the forming cycle times, so that, once the cutting signal has been lost, collisions among the mechanisms of the machine and, finally, the maladjustment of such mechanisms, may be caused.

Furthermore, said control does not have the capability to calculate a new forming cycle in case of variations in said cycle, thus again causing collisions among the mechanisms.

In view of the limitations of the prior art, the inventor of the present invention developed an intelligent digital controller for predicting and automatically compensating for timing variations, in machines for forming articles of glass, which controller is not mechanically linked to the machine and, consequently, does not include mechanical parts susceptible to wear (as in the mechanical encoder) whereby the operation of the machine and the gob distributor might get out of phase one with the other.

The intelligent controller of this invention continually recalculates the cycle time and the waiting time so that, if the signal from the gob sensor should not arrive, a firing signal is generated within the latest calculated cycle and stepped adjustments are made in the timing of the mechanisms as a function of the latest calculated cycle and in accordance with the dead times of the mechanisms, in order to prevent the new forming cycles from overlapping and the mechanisms from colliding so that, when the gob sensor once again sends a signal, said signal is used as a new point of reference.

Furthermore, since the subject invention includes at least one real-time data processing unit the memory whereof contains a mathematical model which calculates the initial forming cycle time and the operation time of the forming mechanisms of the machine, compares them with the present and past operation times and initiates the next forming cycle in all the sections of the machine, said invention compensates for variations in the periods of the cycle time.

Said real-time processing unit may be considered as an independent prediction and compensation computer and supplies prediction and compensation data to each one of the processors, corresponding to each machine section, of the central or master controller, for the purpose of actuating the mechanisms in accordance with the control program of the central or master controller and with the data from the prediction and compensation computing processor.

On the other hand, when the processors corresponding to each section of the machine have time and capacity to make the prediction and compensation calculations, the corresponding processor will become integrated with each one of said individual processors of the central or master control, for each section of the machine.

BRIEF SUMMARY OF THE INVENTION

It is therefore a principal object of the present invention to provide an intelligent controller for predicting and automatically compensating for variations in cycle time, in machines for forming articles of glass or other materials, which enables consistency to be maintained in the successive repetitions of the forming cycles of the individual sections of the machine.

It is a further principal object of the present invention to provide an intelligent controller of the same nature as that previously indicated, which predicts estimated machine cycle times based on present and past measurements, in order to compensate for variations in cycle time, thereby preventing mechanical failures and the colliding of mechanisms.

A further principal object of the present invention is to provide an intelligent controller of the nature described, which enables a cycle to be repeated even in cases when the signals of information from the machine are lost, and the beginning and duration of the forming cycles to be determined.

Yet another principal object of this invention is to provide an intelligent controller of the nature described, which eliminates time slippages of the machine sections due to failures of the sensor signals, by generating a simulated signal which allows production to be continued and on the return of the sensor signal, eliminates the simulated signal and once again uses said sensor signals as references.

These and other objects and advantages of the present invention will become evident to those well versed in the art, from the following detailed description of the invention which will be given with reference to specific modalities of the same as illustrated in the annexed drawings.

DESCRIPTION OF THE INVENTION

Figure 2:
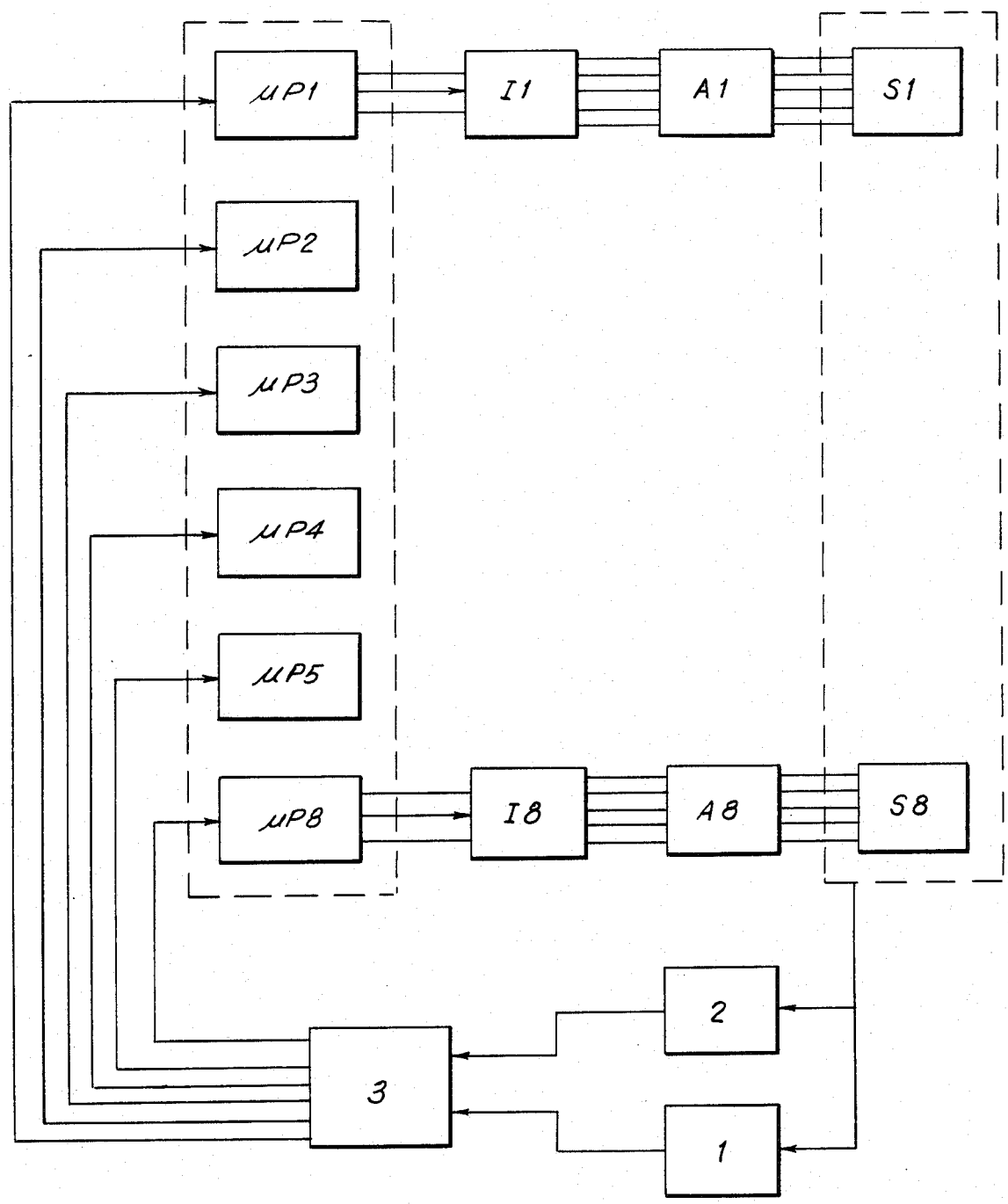

There follows a detailed description of the invention with reference to a specific modality of the same illustrated in the annexed drawings in which the numbers and literals refer to the same parts in the several figures and in which:

FIG. 1 is a block diagram of a first modality of the intelligent controller for predicting and automatically compensating for cycle time variations in machines for forming articles of glass or other materials, of the present invention, connected to the central or master control of the machine; and FIG. 2 is a block diagram of a second modality of the intelligent controller of the present invention, in which the central or master control possesses the capability, claimed by this invention, of prediction, compensation and control calculations in accordance with the signals detected by the gob cutting and forming cycle sensors.

With reference to FIG. 1, the intelligent controller for predicting and automatically compensating for cycle time variations in machines for forming articles of glass or other materials, of the present invention, comprises principally: an operation cycle sensor 1 which detects the operating cycle of each one of the mechanisms of all the sections of the machine; a gob cutting sensor 2 which detects the moment at which a gob is cut and sent to one of the sections S1 through S8 of the machine; a signal conditioner 3 to condition the signals detected by the cycle sensor 1 and by the gob sensor 2; and a real-time data processor or microprocessor 4 which receives and processes the conditioned signals of sensors 1 and 2 and calculates the initial forming cycle time and the operating times of the forming mechanisms and compares the present and past cycle times in order to predict the next machine forming cycle start-up, so that variations in the cycle periods can be compensated for and/or the cycle can be determined in case the detected signals are lost, and, through a data channel 5 and command lines 6, provides these adjustment and compensation data to each one of the microprocessors $\mu P1$ through $\mu P8$ of the central or master control 7 of the machine, in order to effect the movements and adjustments necessary in each one of the sections S1 through S8 of the I.S. machine through the respective interfaces I1 through I8 and the actuators A1 through A8.

As may be seen in FIG. 2, when each one of the microprocessors $\mu P1$ through $\mu P8$ of the central or master control 7 has time and capacity to make the prediction and compensation calculations, as well as the control calculations, it is not necessary to include the independent computing processor 4 as in the modality of FIG. 1, since said microprocessor will be included in each one of the microprocessors $\mu P1$ through $\mu P8$ the memory whereof includes a mathematical model for calculating said predictions and compensations.

The operation of the intelligent prediction and compensation controller of the present invention takes place as follows: on initiating the forming cycle, the central or master controller 7 waits for the data on the history of fabrication of the given type of articles that are to be manufactured, so as to calculate the firing times of the mechanisms of the machine; the controller is started up by sending a start-up signal and the microprocessors $\mu P1$ through $\mu P8$ calculate the cycle time of the article and verify that the data supplied are in agreement with the calculated cycle time. If the information is correct, there follows the calculation of the firing time of each mechanism, using the data supplied and the calculated cycle time, whereupon the machine is started up. During the operation of the intelligent prediction and compensation controller, the control link works in parallel, either through its independent microprocessor 4 or through microprocessors $\mu P1$ through $\mu P8$ which can attend to their several tasks; thus it can be said that the prediction controller is an active redundant element of the gob cutting sensor, since it detects the signal from said sensor and, if such should not be generated, sends such a signal with some delay and the compensation system acts when a change in the cycle time is detected, being based on the latest cycle time and the dead time between mechanisms, and makes adjustments to the firing time of each mechanism in such a way that there are no collisions among them; after making the adjustment, the new cycle time is used as the basis for fresh synchronization with the sensor.

In this way, a reliable control over the operation of the machine is achieved through the working of the central or master control which controls the actuation of the mechanisms of the machine, and also through the working of the intelligent controller of the present invention which provides the necessary compensations for changes in cycle time and provides the cycle time, in cases where the gob cutting signal is lost, in accordance with the present and past cycle times, if this should be necessary.

Finally, it should be understood that the invention is not limited exclusively to the modalities herein described for illustrative purposes only, and that experts in the art would be able, through the teaching of this invention, to make changes in the design and distribution of the components of the intelligent controller of this invention, which, nevertheless, are comprised within the true spirit and scope thereof which is claimed according to the following claims.

We claim:

1. A controller for predicting and automatically compensating for variations in cycle time in glassware forming machines of the I.S. type having multiple sections each including respective molds and forming mechanisms, comprising:

a first data processor for each section of the machine, each of which provides signals representative of the time and sequence of operation for the mechanisms of the corresponding section;

a first signal convertor for each data processor, which adapts the signals provided by the respective data processor;

actuator means for each section, receiving the adapted signals from the respective data processor, to operate the mechanisms of the respective section in time and sequence established by the data processor;

sensing means providing signals representative of forming cycles of the machine;

a second signal convertor which adapts the signals provided by the sensor means; and, a second real-time data processor which receives and processes the adapted signals of the sensor means which is operative to calculate the initial forming cycle time of the machine;

to compare the present and past cycle times in order to predict the next forming cycle start up of the machine;

to determine the forming cycle if the signals of the sensor means are lost; and, to compensate for variations in the forming cycle times by providing corresponding signals to the first data processor of each section of the machine.

* * * * *